(12) United States Patent
Wong

(10) Patent No.: US 6,891,315 B2
(45) Date of Patent: May 10, 2005

(54) SHEAR MODE LIQUID METAL SWITCH

(75) Inventor: Marvin Glenn Wong, Woodland Park, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 190 days.

(21) Appl. No.: 10/413,314

(22) Filed: Apr. 14, 2003

(65) Prior Publication Data

US 2004/0201323 A1 Oct. 14, 2004

(51) Int. Cl.[7] .................. H01H 29/00; H01H 57/00; H01L 41/08
(52) U.S. Cl. .................. 310/328; 310/333; 310/344; 200/182; 200/187; 200/188; 200/189; 200/211; 200/212; 200/214; 385/9; 385/147
(58) Field of Search ................. 310/328, 333, 310/344, 348; 200/182, 211, 187–189, 212, 214, 215, 219

(56) References Cited

U.S. PATENT DOCUMENTS

| | | |
|---|---|---|
| 2,312,672 A | 3/1943 | Pollard, Jr. |
| 2,564,081 A | 8/1951 | Schilling |
| 3,430,020 A | 2/1969 | Von Tomkewitsch et al. |
| 3,529,268 A | 9/1970 | Rauterberg |
| 3,600,537 A | 8/1971 | Twyford |
| 3,639,165 A | 2/1972 | Rairden, III |
| 3,657,647 A | 4/1972 | Beusman et al. |
| 4,103,135 A | 7/1978 | Gomez et al. |
| 4,200,779 A | 4/1980 | Zakurdaev et al. |
| 4,238,748 A | 12/1980 | Goullin et al. |
| 4,245,886 A | 1/1981 | Kolodzey et al. |
| 4,336,570 A | 6/1982 | Brower |
| 4,419,650 A | 12/1983 | John |
| 4,434,337 A | 2/1984 | Becker |
| 4,475,033 A | 10/1984 | Willemsen et al. |
| 4,505,539 A | 3/1985 | Auracher et al. |
| 4,582,391 A | 4/1986 | Legrand |
| 4,628,161 A | 12/1986 | Thackrey |
| 4,652,710 A | 3/1987 | Karnowsky et al. |
| 4,657,339 A | 4/1987 | Fick |
| 4,742,263 A | 5/1988 | Harnden, Jr. et al. |
| 4,786,130 A | 11/1988 | Georgiou et al. |
| 4,797,519 A | 1/1989 | Elenbaas |
| 4,804,932 A | 2/1989 | Akanuma et al. |
| 4,988,157 A | 1/1991 | Jackel et al. |
| 5,278,012 A | 1/1994 | Yamanaka et al. |
| 5,415,026 A | 5/1995 | Ford |
| 5,502,781 A | 3/1996 | Li et al. |
| 5,644,676 A | 7/1997 | Blomberg et al. |
| 5,675,310 A | 10/1997 | Wojnarowski et al. |
| 5,677,823 A | 10/1997 | Smith |
| 5,751,074 A | 5/1998 | Prior et al. |
| 5,751,552 A | 5/1998 | Scanlan et al. |
| 5,828,799 A | 10/1998 | Donald |
| 5,841,686 A | 11/1998 | Chu et al. |
| 5,849,623 A | 12/1998 | Wojnarowski et al. |
| 5,874,770 A | 2/1999 | Saia et al. |
| 5,875,531 A | 3/1999 | Nellissen et al. |
| 5,886,407 A | 3/1999 | Polese et al. |
| 5,889,325 A | 3/1999 | Uchida et al. |

(Continued)

*Primary Examiner*—Thomas M. Dougherty

(57) ABSTRACT

A piezoelectric relay is disclosed in which a liquid metal droplet is moved within a switching channel formed in relay housing. A signal path passing through the switching channel is blocked or unblocked by motion of the liquid metal droplet that coalesces with one of two additional liquid metal droplets. Motion of the liquid metal droplets is controlled by piezoelectric pumps that control the flow of actuation fluid between a fluid reservoir and the switching channel. The liquid metal droplets are held in place by surface tension acting on wettable contact pads within the switching channel. The surface tension of the liquid provides a latching mechanism for the relay.

22 Claims, 6 Drawing Sheets

U.S. PATENT DOCUMENTS

| | | |
|---|---|---|
| 5,912,606 A | 6/1999 | Nathanson et al. |
| 5,915,050 A | 6/1999 | Russell et al. |
| 5,972,737 A | 10/1999 | Polese et al. |
| 5,994,750 A | 11/1999 | Yagi |
| 6,021,048 A | 2/2000 | Smith |
| 6,180,873 B1 | 1/2001 | Bitko |
| 6,201,682 B1 | 3/2001 | Mooij et al. |
| 6,207,234 B1 | 3/2001 | Jiang |
| 6,212,308 B1 | 4/2001 | Donald |
| 6,225,133 B1 | 5/2001 | Yamamichi et al. |
| 6,278,541 B1 | 8/2001 | Baker |
| 6,304,450 B1 | 10/2001 | Dibene, II et al. |
| 6,320,994 B1 | 11/2001 | Donald et al. |
| 6,351,579 B1 | 2/2002 | Early et al. |
| 6,356,679 B1 | 3/2002 | Kapany |
| 6,396,012 B1 | 5/2002 | Bloomfield |
| 6,396,371 B2 | 5/2002 | Streeter et al. |
| 6,408,112 B1 | 6/2002 | Bartels |
| 6,446,317 B1 | 9/2002 | Figueroa et al. |
| 6,453,086 B1 | 9/2002 | Tarazona |
| 6,470,106 B2 | 10/2002 | McClelland et al. |
| 6,487,333 B2 | 11/2002 | Fouquet |
| 6,501,354 B1 | 12/2002 | Gutierrez et al. |
| 6,516,504 B2 | 2/2003 | Schaper |
| 6,559,420 B1 | 5/2003 | Zarev |
| 6,633,213 B1 | 10/2003 | Dove |
| 6,768,068 B1 * | 7/2004 | Wong et al. ................ 200/182 |
| 2002/0037128 A1 | 3/2002 | Burger, et al. |
| 2002/0146197 A1 | 10/2002 | Yong |
| 2002/0150323 A1 | 10/2002 | Nishida et al. |
| 2002/0168133 A1 | 11/2002 | Saito |
| 2003/0035611 A1 | 2/2003 | Shi |
| 2003/0080650 A1 * | 5/2003 | Wong et al. ................ 310/328 |

* cited by examiner

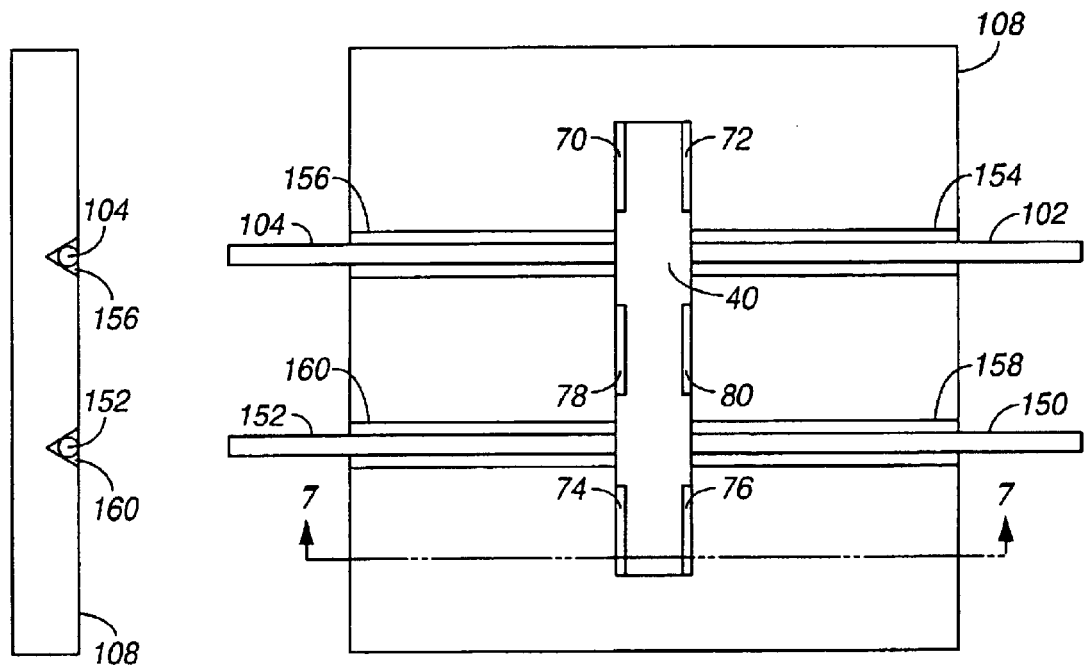
FIG. 8  FIG. 6
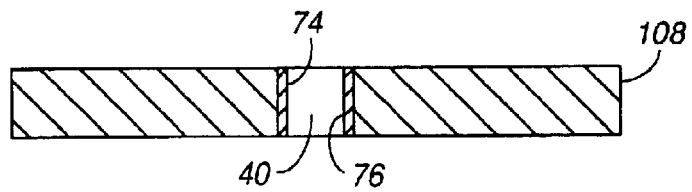
FIG. 7

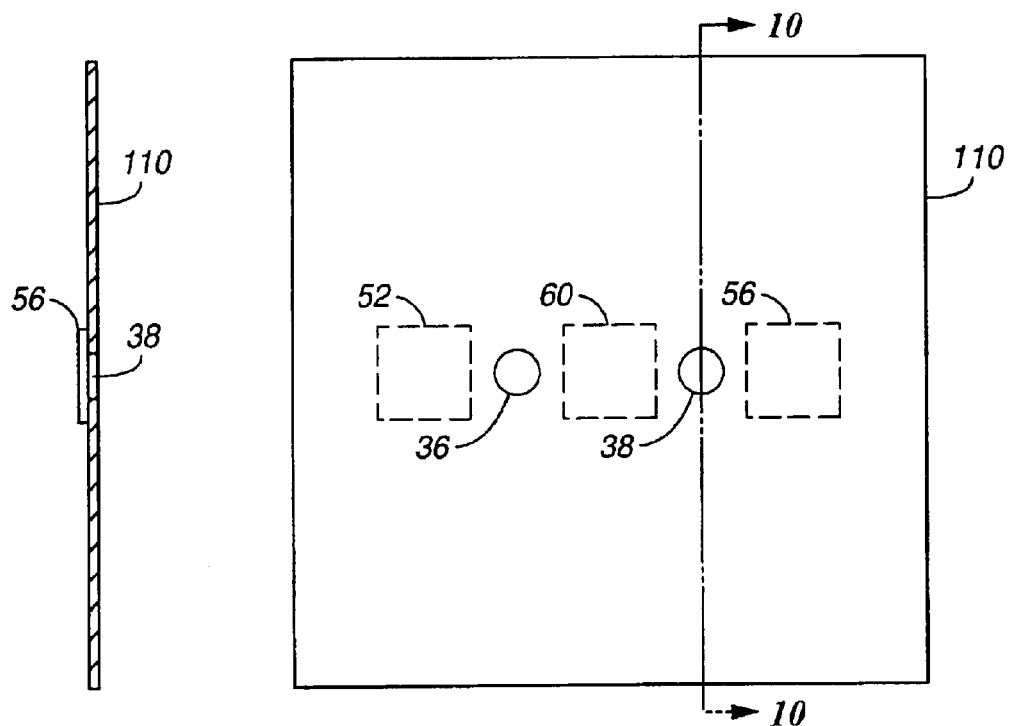
*FIG. 10*   *FIG. 9*
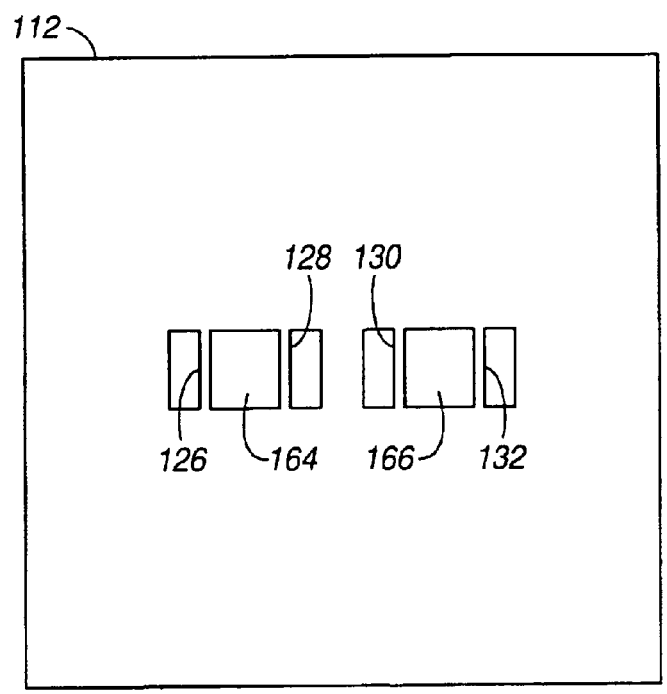
*FIG. 11*

SHEAR MODE LIQUID METAL SWITCH

CROSS REFERENCE TO RELATED APPLICATIONS

This application is related to the following co-pending U.S. patent applications, being identified by the below enumerated identifiers and arranged in alphanumerical order, which have the same ownership as the present application and to that extent are related to the present application and which are hereby incorporated by reference:

Application 10010448-1, titled "Piezoelectrically Actuated Liquid Metal Switch", filed May 2, 2002 and identified by Ser. No. 10/137,691;

Application 10010529-1, "Bending Mode Latching Relay", and having the same filing date as the present application;

Application 10010531-1, "High Frequency Bending Mode Latching Relay", and having the same filing date as the present application;

Application 10010570-1, titled "Piezoelectrically Actuated Liquid Metal Switch", filed May 2, 2002 and identified by Ser. No. 10/142,076;

Application 10010571-1, "High-frequency, Liquid Metal, Latching Relay with Face Contact", and having the same filing date as the present application;

Application 10010572-1, "Liquid Metal, Latching Relay with Face Contact", and having the same filing date as the present application;

Application 10010573-1, "Insertion Type Liquid Metal Latching Relay", and having the same filing date as the present application;

Application 10010617-1, "High-frequency, Liquid Metal, Latching Relay Array", and having the same filing date as the present application;

Application 10010618-1, "Insertion Type Liquid Metal Latching Relay Array", and having the same filing date as the present application;

Application 10010634-1, "Liquid Metal Optical Relay", and having the same filing date as the present application;

Application 10010640-1, titled "A Longitudinal Piezoelectric Optical Latching Relay", filed Oct. 31, 2001 and identified by Ser. No. 09/999,590;

Application 10010644-1, "Bending Mode Liquid Metal Switch", and having the same filing date as the present application;

Application 10010656-1, titled "A Longitudinal Mode Optical Latching Relay", and having the same filing date as the present application;

Application 10010663-1, "Method and Structure for a Pusher-Mode Piezoelectrically Actuated Liquid Metal Switch", and having the same filing date as the present application;

Application 10010664-1, "Method and Structure for a Pusher-Mode Piezoelectrically Actuated Liquid Metal Optical Switch", and having the same filing date as the present application;

Application 10010790-1, titled "Switch and Production Thereof", filed Dec. 12, 2002 and identified by Ser. No. 10/317,597;

Application 10011055-1, "High Frequency Latching Relay with Bending Switch Bar", and having the same filing date as the present application;

Application 10011056-1, "Latching Relay with Switch Bar", and having the same filing date as the present application;

Application 10011064-1, "High Frequency Push-mode Latching Relay", and having the same filing date as the present application;

Application 10011065-1, "Push-mode Latching Relay", and having the same filing date as the present application;

Application 10011121-1, "Closed Loop Piezoelectric Pump", and having the same filing date as the present application;

Application 10011329-1, titled "Solid Slug Longitudinal Piezoelectric Latching Relay", filed May 2, 2002 and identified by Ser. No. 10/137,692;

Application 10011344-1, "Method and Structure for a Slug Pusher-Mode Piezoelectrically Actuated Liquid Metal Switch", and having the same filing date as the present application;

Application 10011345-1, "Method and Structure for a Slug Assisted Longitudinal Piezoelectrically Actuated Liquid Metal Optical Switch", and having the same filing date as the present application;

Application 10011397-1, "Method and Structure for a Slug Assisted Pusher-Mode Piezoelectrically Actuated Liquid Metal Optical Switch", and having the same filing date as the present application;

Application 10011398-1, "Polymeric Liquid Metal Switch", and having the same filing date as the present application;

Application 10011410-1, "Polymeric Liquid Metal Optical Switch", and having the same filing date as the present application;

Application 10011436-1, "Longitudinal Electromagnetic Latching Optical Relay", and having the same filing date as the present application;

Application 10011437-1, "Longitudinal Electromagnetic Latching Relay", and having the same filing date as the present application;

Application 10011458-1, "Damped Longitudinal Mode Optical Latching Relay", and having the same filing date as the present application;

Application 10011459-1, "Damped Longitudinal Mode Latching Relay", and having the same filing date as the present application;

Application 10020013-1, titled "Switch and Method for Producing the Same", filed Dec. 12, 2002 and identified by Ser. No. 10/317,963;

Application 10020027-1, titled "Piezoelectric Optical Relay", filed Mar. 28, 2002 and identified by Ser. No. 10/109,309;

Application 10020071-1, titled "Electrically Isolated Liquid Metal Micro-Switches for Integrally Shielded Microcircuits", filed Oct. 8, 2002 and identified by Ser. No. 10/266,872;

Application 10020073-1, titled "Piezoelectric Optical Demultiplexing Switch", filed Apr. 10, 2002 and identified by Ser. No. 10/119,503;

Application 10020162-1, titled "Volume Adjustment Apparatus and Method for Use", filed Dec. 12, 2002 and identified by Ser. No. 10/317,293;

Application 10020241-1, "Method and Apparatus for Maintaining a Liquid Metal Switch in a Ready-to-Switch Condition", and having the same filing date as the present application;

Application 10020242-1, titled "A Longitudinal Mode Solid Slug Optical Latching Relay", and having the same filing date as the present application;

Application 10020473-1, titled "Reflecting Wedge Optical Wavelength Multiplexer/Demultiplexer", and having the same filing date as the present application;

Application 10020540-1, "Method and Structure for a Solid Slug Caterpillar Piezoelectric Relay", and having the same filing date as the present application;

Application 10020541-1, titled "Method and Structure for a Solid Slug Caterpillar Piezoelectric Optical Relay", and having the same filing date as the present application;

Application 10030438-1, "Inserting-finger Liquid Metal Relay", and having the same filing date as the present application;

Application 10030440-1, "Wetting Finger Liquid Metal Latching Relay", and having the same filing date as the present application;

Application 10030521-1, "Pressure Actuated Optical Latching Relay", and having the same filing date as the present application;

Application 10030522-1, "Pressure Actuated Solid Slug Optical Latching Relay", and having the same filing date as the present application; and Application 10030546-1, "Method and Structure for a Slug Caterpillar Piezoelectric Reflective Optical Relay", and having the same filing date as the present application.

FIELD OF THE INVENTION

The invention relates to the field of switching relays, and in particular to a piezoelectrically actuated relay that latches by means of liquid surface tension.

BACKGROUND OF THE INVENTION

Communications systems using optical signals require the use of optical switches and routers. An early approach to optical switching was to convert the optical signal to an electrical signal, use an electrical switch or router and then convert back to an optical signal. More recently, optical relays have been used in which an electrical control signal is used to control the switching or routing of an optical signal. Optical relays typically switch optical signals by using movable solid mirrors or by using the creation of vapor bubbles to alter the index of refraction inside a cavity. The moveable mirrors may use electrostatic latching mechanisms, whereas bubble switches do not latch. Piezoelectric latching relays either use residual charges in the piezoelectric material to latch, or actuate switch contacts containing a latching mechanism.

Liquid metal is also used in electrical relays. A liquid metal droplet can be moved by a variety of techniques, including electrostatic forces, variable geometry due to thermal expansion/contraction, and pressure gradients. When the dimension of interest shrinks, the surface tension of the liquid metal becomes the dominant force over other forces, such as body forces (inertia). Consequently, some micro-electromechanical (MEM) systems utilize liquid metal switching.

SUMMARY

The present invention relates to a switch in which a liquid metal droplet is moved within a channel and used to block or unblock a signal path passing through the channel. The liquid metal droplet is moved by piezoelectric elements operating in a shear mode to displace an actuation fluid. The liquid metal droplet adheres to wettable metal contact pads within the channel to provide a latching mechanism.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

FIG. 6 is top view of a switching layer of an optical relay in accordance with certain embodiments of the present invention.

FIG. 7 is sectional view through a switching layer of an optical relay in accordance with certain embodiments of the present invention.

FIG. 8 is side view of a switching layer of an optical relay in accordance with certain embodiments of the present invention.

FIG. 9 is top view of a channel cap layer of an optical relay in accordance with certain embodiments of the present invention.

FIG. 10 is sectional view through a channel cap layer of an optical relay in accordance with certain embodiments of the present invention.

FIG. 11 is top view of a piezoelectric layer of an optical relay in accordance with certain embodiments of the present invention.

DETAILED DESCRIPTION

Figure 1:
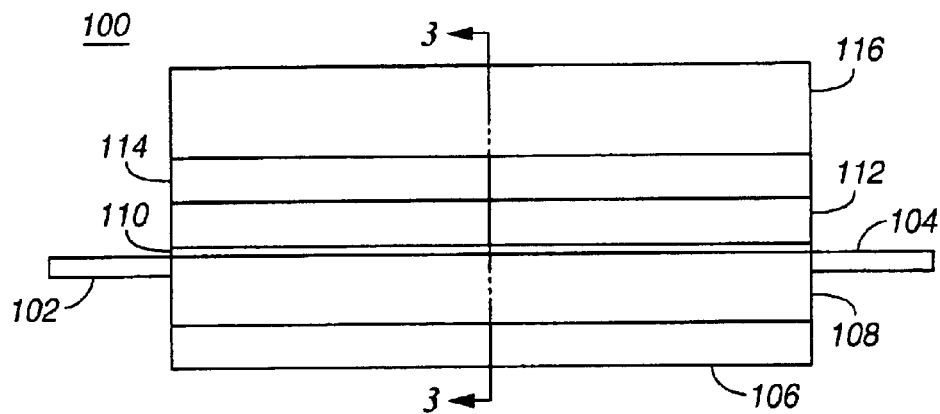
FIG. 1 is an end view of an optical relay in accordance with certain embodiments of the present invention.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several views of the drawings.

The present invention relates to a piezoelectrically actuated relay that switches and latches by means of a liquid metal droplet moving within a switching channel.

In an exemplary embodiment, the relay uses piezoelectric elements, operating in a shear mode, to displace an actuating liquid that in turn displaces the liquid metal. The liquid metal blocks or unblocks an optical path, allowing the switching of optical signals. The liquid metal, which may be mercury, wets at least one fixed contact pad on the relay housing and is held in place by surface tension. It is noted that a switching of one or more electrical signals is also possible, wherein the switching of the one or more electrical signals may be accomplished by coupling the one or more electrical signals to a one or more contact pads. The switching of the one or more electrical signals and the switching of the optical signals may be facilitated by the use of a slug coupled to the liquid metal. In an exemplary embodiment of switching the one or more electrical signals, the slug and the liquid metal is coupled to two of the one or more contact pads so that an electrical signal path is completed that is operable to switch an electrical signal of the one or more electrical signals. In an exemplary embodiment of switching the one or more optical signals, the slug and the liquid metal are operable to block or unblock one or more of the optical signals. Magnetorestrictive elements, such as Terfenol-D, that deform in the presence of a magnetic field may be used as an alternative to piezoelectric elements. In the sequel, piezoelectric elements and magnetorestrictive elements will be collectively referred to as "piezoelectric elements".

In one embodiment, micro-machining techniques are used to manufacture the relay. An end view of an optical relay 100 is shown in FIG. 1. In operation, an optical signal enters the relay through an optical fiber or waveguide 102 and, if not blocked in the relay, exits through optical fiber or waveguide 104. In this embodiment, the body of the relay is made up of six layers and is amenable to manufacture by micro-machining. The lowest layer is a circuit substrate 106 that will be described in more detail below with reference to FIG. 5. The next layer is a switching layer 108. The switching of the optical signal occurs in a switching channel contained in this layer. The next layer is a channel cap layer 110 that contains through-holes (vias) that allow an actuating liquid to enter or leave the switching channel. The piezoelectric layer 112 contains piezoelectric elements that operate to pump the actuating liquid in or out of the switching channel. The passage layer 114 provides fluid passages between the piezoelectric layer 112 and a reservoir layer 116. In other embodiments, the passages are incorporated into the piezoelectric layer 112 or the reservoir layer 116. The section 3—3 is shown in FIG. 3.

In a first mode of operation, an optical signal enters the relay through an optical fiber or waveguide and, if not blocked in the relay, exits through the optical fiber or waveguide. In a second mode of operation, an electrical signal is coupled to two of the contact pads, wherein the two contact pads are coupled by the liquid metal. In a third mode of operation, the slug is coupled to the two contact pads and further coupled to the liquid metal. In the second and third mode of operation, the optical waveguides need not be present, as switching may be accomplished using liquid metal coupling to the contact pads. In a fourth mode of operation, the slug is operable to block or unblock the optical signal.

Figure 2:
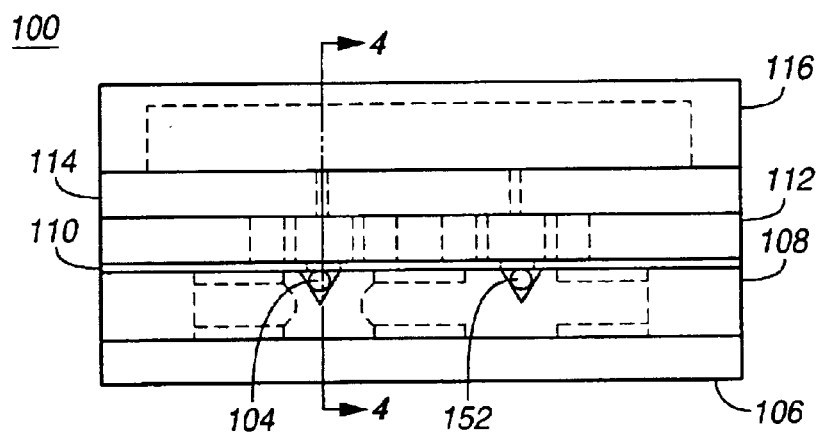
FIG. 2 is a side view of an optical relay in accordance with certain embodiments of the present invention.
Figure 4:
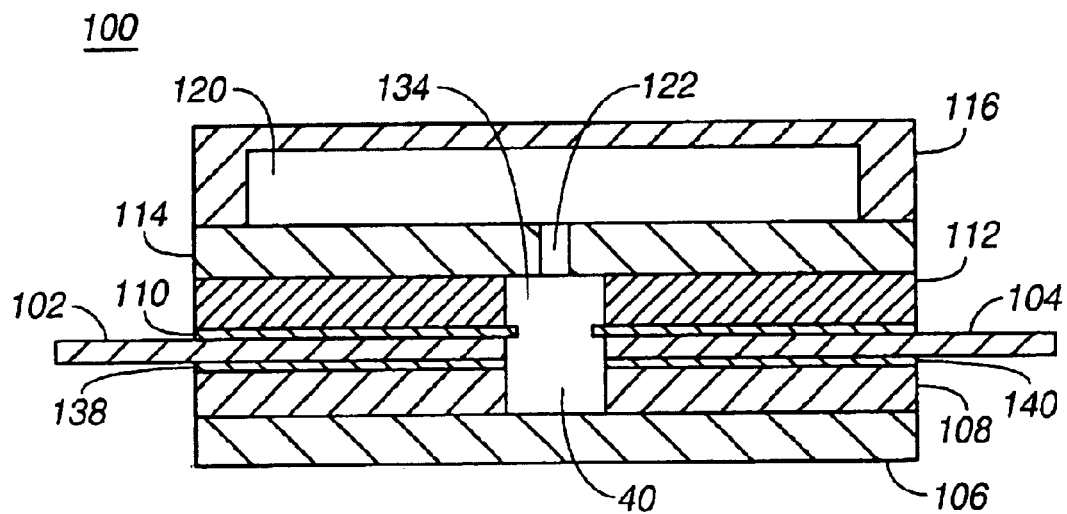
FIG. 4 is a further sectional view of optical relay in accordance with certain embodiments of the present invention.

FIG. 2 is a side view of an optical relay 100. Optical waveguides or fibers 104 and 152 allow optical signals to enter the optical layer 108 of the relay. The section 4—4 is shown in FIG. 4.

Figure 3:
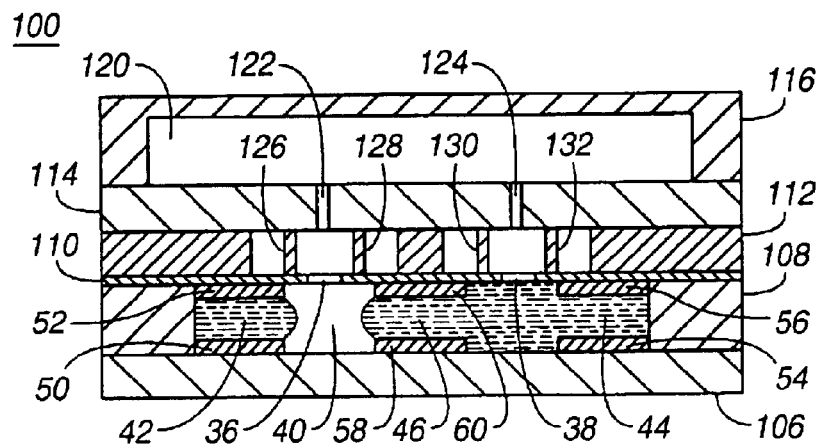
FIG. 3 is a sectional view of optical relay in accordance with certain embodiments of the present invention.

FIG. 3 is a cross-sectional view through section 3—3 of the relay in FIG. 1. A switching channel 40 is formed in the switching layer 108. A central droplet of liquid metal 46 is moveably positioned within the switching channel. In an exemplary embodiment, the liquid metal is mercury. The central liquid metal droplet 46 may be moved to coalesce with one of the further liquid droplets 42 and 44. The liquid metal droplets are in wetted contact with contact pads 50, 52, 54, 56, 58 and 60. The contact pads may be made of seal belt metal, for example, and couple with contact pads on the sides of the switching channel to form rings or belts within the channel. Surface tension in the liquid metal droplets resists motion of the liquid. When the liquid metal droplets 44 and 46 are coalesced, as shown in FIG. 3, there is no gap between the droplets through which light can pass. However, light may pass through the gap between liquid droplets 42 and 46. By coupling waveguides across the gap, the liquid metal droplets can be used to block or unblock light transmission between the optical waveguides. It is noted that in certain embodiments of the present invention, the slug may be coupled to the liquid metal droplets so that the liquid metal droplets and the slug may be used to block or unblock light transmission between the optical waveguides. It is further noted that the contact pads may be used to switch electrical signals, wherein the electrical signals are switched based upon a position of the liquid metal droplets. Motion of the liquid metal droplets is controlled by a transparent, inert, electrically non-conducting actuation fluid that fills the interior of the relay surrounding the liquid metal.

The next layer is a channel cap layer 110. This layer is optional, since its function may be incorporated into the piezoelectric layer 108 or the passage layer 114. The channel cap layer 110 contains two orifices, 36 and 38, which are positioned between the contact pads. The liquid metal is moved by pumping actuation fluid through the orifice 38 into the switching channel and, optionally, pumping actuation fluid out of the switching channel through orifice 36.

The next layer is a piezoelectric layer 112 containing piezoelectric elements 126, 128, 130, 132 that provide the pumping action. This layer will be described in more detail with reference to FIG. 11, FIG. 12 and FIG.13.

The next layer is a passage layer 114 that allows actuation fluid to flow in and out of the piezoelectric layer 112. The actuation fluid flows through fluid passages 122 and 124. These passages are sized to restrict rapid fluid flow, and permit pressure equalization. In an exemplary embodiment, the diameter and length of the passages 122 and 124 are chosen so that action of the piezoelectric pumps causes greater flow through the orifices 36 and 38 than through the passages 122 and 124.

The final layer is a reservoir layer 116 that contains actuation fluid in a reservoir or cavity 120. Actuation fluid passes between the reservoir and the piezoelectric pumps through the fluid passages 122 and 124.

A cross-section view through an optical path of the relay is shown in FIG. 4. Optical waveguide 102, which may be an optical fiber, is embedded in a notch 138 in the switching layer 108 and is held in place by encapsulant or adhesive. Light propagating along the waveguide 102 enters the switching channel 40 and couples to a second optical waveguide 104 embedded in a further notch 140 in the switching layer 108. When liquid metal enters the switching channel 40, the optical path is broken. In certain embodiments of the present invention, the optical path may be broken by the presence of the slug coupled to the liquid metal. At the same time, displaced actuation fluid passes through the pumping chamber 134 and the fluid passage 122 into the actuation fluid reservoir 120. Optionally, the pumping chamber 134 can be expanded to remove the displaced actuation fluid.

Figure 5:
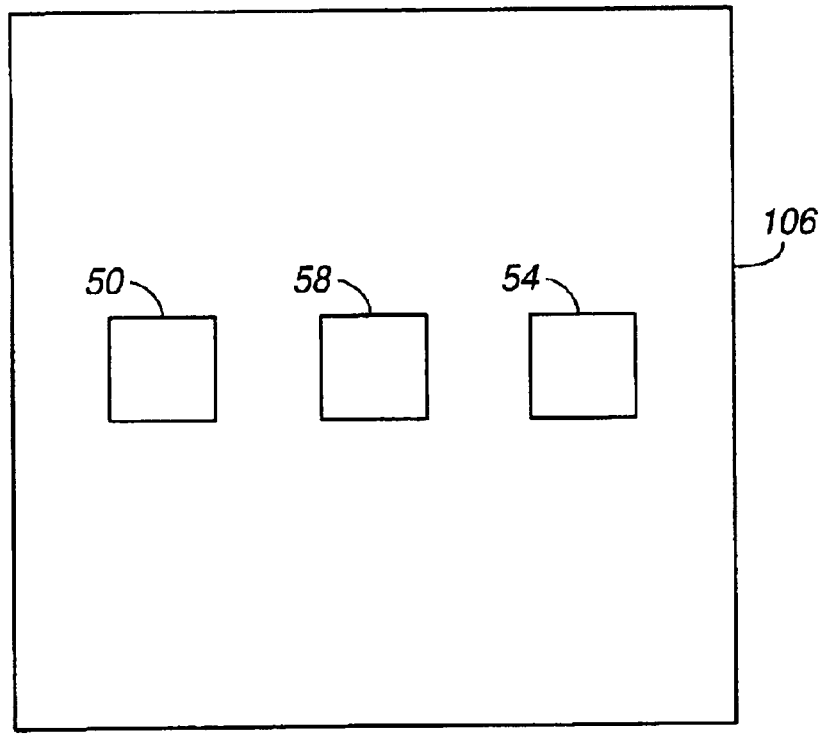
FIG. 5 is top view of a circuit substrate layer of an optical relay in accordance with certain embodiments of the present invention.

The layers of the optical relay will now be described in more detail. FIG. 5 is a top view of the circuit substrate layer 106. Contact pads 50, 54 and 58 are deposited on the surface of the circuit substrate layer 106. The contact pads may be formed of seal belt metal, for example, and are wettable by the liquid metal in the switching channel. In addition, electrical circuitry (not shown) to supply control signals to the piezoelectric pumps may be deposited on the circuit substrate layer.

FIG. 6 is a top view of the switching layer 108 of the relay. A switching channel 40 is formed in the layer. Contact pads 70, 72, 74, 76, 78 and 80 are fixed to the sides of the switching channel at various positions. These contact pads align with the contact pads shown in FIG. 3 to form contact pads on all four sides of the switching channel. In certain embodiments of the present invention, the contact pads are operable to be used to switch one or more electrical signals. Optical waveguides 102, 104, 150, 152 are embedded in notches 154, 156, 158, 160 respectively. Optical waveguides 102 and 104 are aligned to form a first optical path, while optional optical waveguides 150 and 152 are aligned to form a second optical path. The ends of the optical waveguides are not wettable by liquid metal so as to preserve optical clarity. FIG. 7 is a sectional view of the switching layer 108 through the section 7—7 shown in FIG. 6. Seal belts 74 and 76 are fixed to the sides of the switching channel 40. FIG. 8 is a side view of the switching layer 108 of the relay. Optical waveguides 104 and 152 are embedded in notches 156 and 160 respectively.

FIG. 9 is a top view of the channel cap layer 110 of the relay. Orifices 36 and 38 allow actuation fluid flow between the piezoelectric pumps and the switching channel. Contact pads 52, 56 and 60 are attached to the under side of the layer 110 and provide the contact pads for the top of the switching channel. FIG. 10 is a sectional view through the section 10—10 of the channel cap layer 110 shown in FIG. 9. The orifice 38 passes through the layer, and the contact pad 56 is attached to the underside of the layer.

Figure 12:
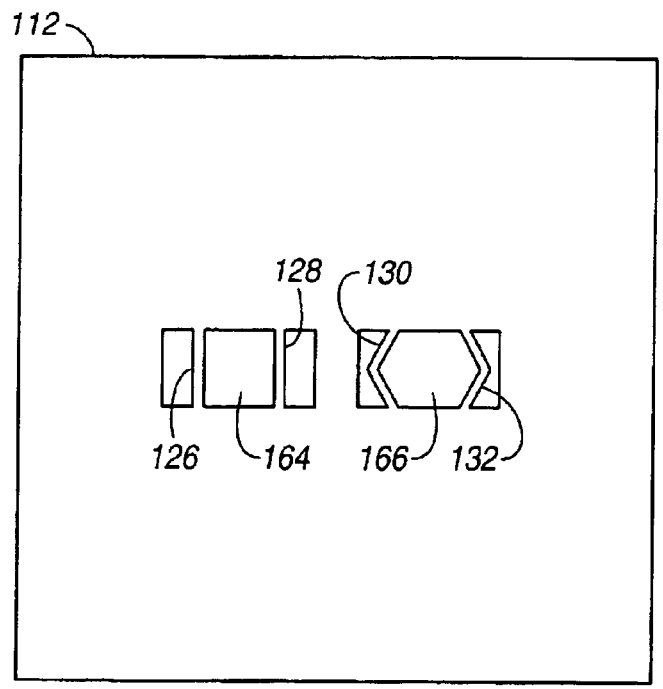
FIG. 12 is top view of a piezoelectric layer of an optical relay with an expanded pumping chamber in accordance with certain embodiments of the present invention.
Figure 13:
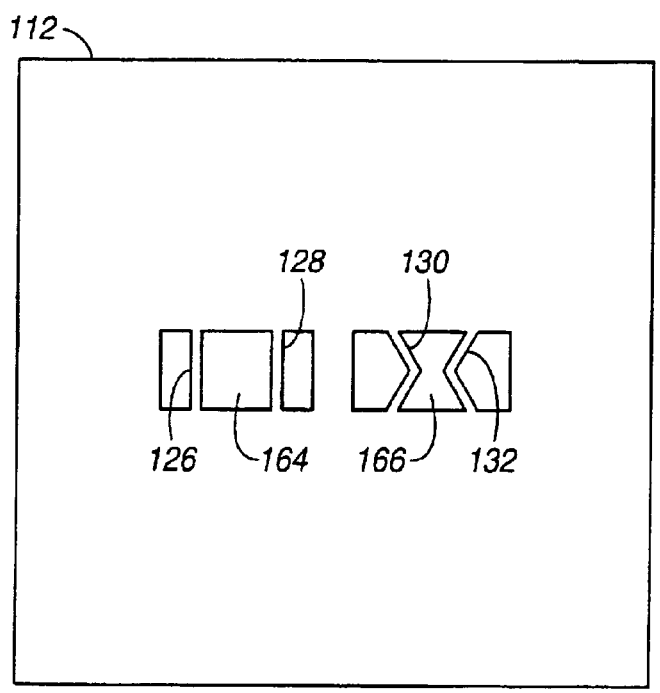
FIG. 13 is top view of a piezoelectric layer of an optical relay with a contracted pumping chamber in accordance with certain embodiments of the present invention.

FIG. 11 is a top view of the piezoelectric layer 112 of the relay. Piezoelectric actuators 126 and 128, positioned in a channel in the layer, form a first pumping chamber 164. Further piezoelectric actuators 130 and 132 form a second pumping chamber 166. Each actuator comprises a pair of piezoelectric elements that may be deformed in a shearing mode by application of an electrical control signal. When a control signal with a first polarity is applied to actuators 130 and 132, the actuators deform in a shear mode as shown in FIG. 12. The volume of the pumping chamber is increased. If the volume is increased rapidly, actuation fluid is drawn mainly from the switching channel because of flow resistance in the fluid passages. If the volume is increased slowly, actuation fluid is drawn mainly from the reservoir because surface tension rests motion of the liquid metal droplets. When a control signal of opposite polarity is applied the piezoelectric actuators deform as shown in FIG. 13. The volume of the pumping chamber is decreased. If the motion of the pump is rapid, actuation fluid is forced into the switching channel and breaks the surface tension bond between the liquid metal droplets (44 and 46 in FIG. 3). The central liquid metal droplet 46 is displaced along the switching channel and coalesces with the liquid metal droplet 42. In this manner, the optical path between optical waveguides 150 and 152 is completed, while the path between optical waveguides 102 and 104 is broken by the presence of liquid metal in the gap between the waveguides. It is noted that in certain embodiments, the slug is coupled to liquid metal droplet 46 so that motion of liquid metal droplet 46 also moves the slug so that the slug assists liquid metal droplet 46 in breaking the path between optical waveguides 150 and 152. It is further noted that when the contact pads are operable to switch one or more electrical signals, the slug and liquid metal droplet 46 may be used to complete an electrical path that carries an electrical signal of the one or more electrical signals.

The two piezoelectric pumps may be used together, with one pump contracting to push actuation liquid into the switching channel while the other pump expands to draw fluid out from the other end of the channel. This increases the force on the liquid metal.

The volume of liquid metal is chosen so that only two volumes need be coalesced at one time.

Figure 15:
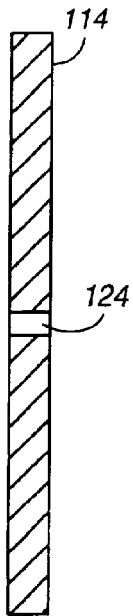
FIG. 15 is sectional view through a passage layer of an optical relay in accordance with certain embodiments of the present invention.
Figure 14:
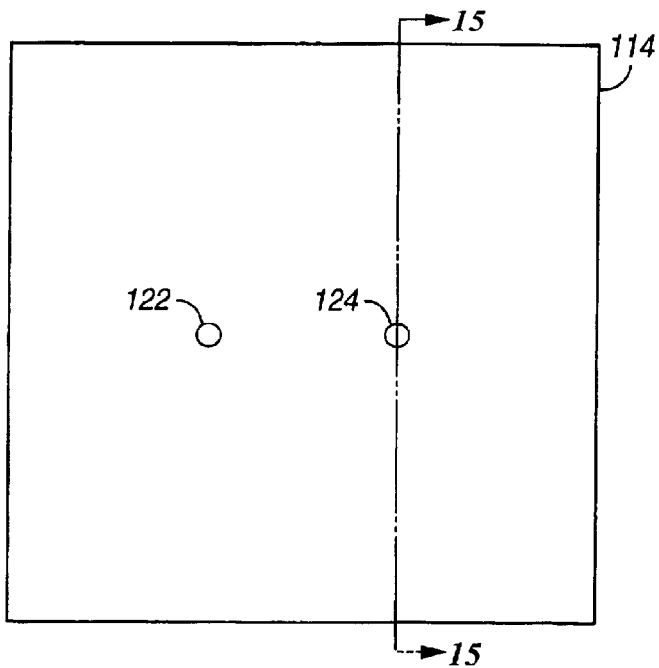
FIG. 14 is top view of a passage layer of an optical relay in accordance with certain embodiments of the present invention.

A top view of the passage layer 114 is shown in FIG. 14. This shows the fluid passages 122 and 124. The size and shape of the these passages, together with the thickness of the passage layer, determine the resistance to fluid flow and are preferably matched to the cycle time of the relay and other dimensions of the relay. FIG. 15 is a cross sectional view through the section 15—15 shown in FIG. 14. The fluid passage 124 passes through the layer. The passages may have shapes other than cylindrical.

Figure 17:
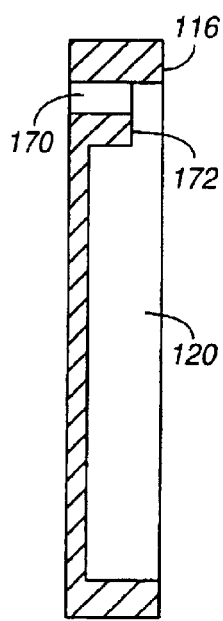
FIG. 17 is sectional view through a reservoir layer of an optical relay in accordance with certain embodiments of the present invention.
Figure 16:
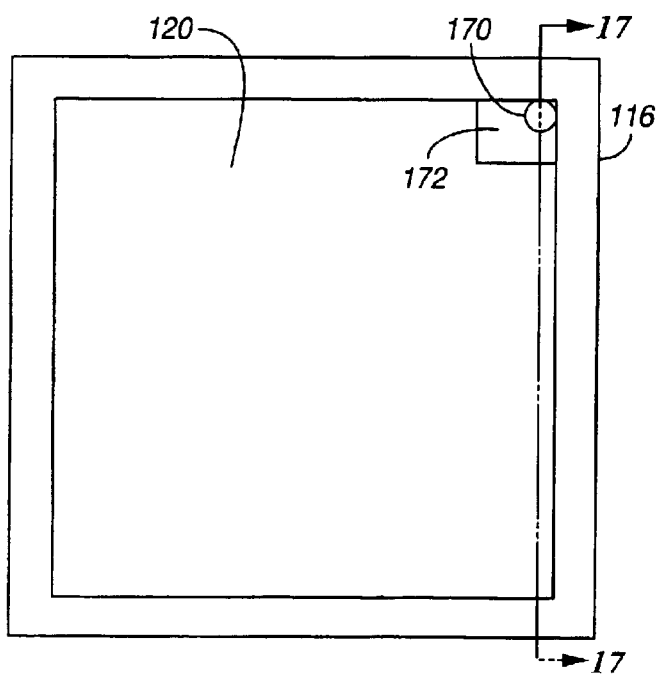
FIG. 16 is bottom view of a reservoir layer of an optical relay in accordance with certain embodiments of the present invention.

FIG. 16 is a view of the reservoir layer 116 of the relay from below. A cavity 120 is formed in the layer 116 to contain the actuation fluid. A hole 170 is provided to allow the reservoir to be filled with actuation fluid after the relay is assembled. The hole may be sealed after the reservoir is filled. The hole may be positioned in a raised platform 172 for greater strength. FIG. 17 is a cross sectional view through the section 17—17 shown in FIG. 16. The hole 170 passes through the raised platform 172 to allow the reservoir 120 to be filled. The wall of the reservoir is compliant so as to reduce pressure pulse interactions (cross-talk) between the piezoelectric pumps The optical relay of the present invention can be made using micro-machining techniques for small size.

An advantage of piezoelectric elements is they are capacitive devices that store energy rather than dissipating it. As a result, power consumption and heat build up is kept to a minimum.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A piezoelectric optical relay comprising:
   a relay housing containing a switching channel;
   a first contact pad located in the switching channel and having a surface wettable by a liquid metal;
   a second contact pad located in the switching channel and having a surface wettable by a liquid metal;
   a third contact pad located in the switching channel between the first and second contact pads and having a surface wettable by a liquid metal;

a first liquid metal droplet in wetted contact with the first contact pad;

a second liquid metal droplet in wetted contact with the second contact pad;

a third liquid metal droplet in wetted contact with the third contact pad and adapted to move within the switching channel to coalesce with one of the first liquid metal droplet and the second liquid metal droplet;

a first optical path passing through the switching channel between the first and third liquid metal droplets;

a first piezoelectric pump operable to pump actuation fluid into the switching channel between the second liquid metal droplet and the third liquid metal droplet, thereby causing the second and third liquid metal droplets to separate and the first and third liquid metal droplets to coalesce; and a second piezoelectric pump operable to pump actuation fluid into the switching channel between the first liquid metal droplet and the third liquid metal droplet, thereby causing the first and third liquid metal droplets to separate and the second and third liquid metal droplets to coalesce;

wherein the first optical path is broken when the first and third liquid metal droplets are coalesced and is completed when the first and third liquid metal droplets are separated.

2. A piezoelectric optical relay in accordance with claim 1, further comprising:

a reservoir, formed within the relay housing, for containing actuation fluid;

a first fluid passage coupling the reservoir to the first piezoelectric pump; and a second fluid passage coupling the reservoir to the second piezoelectric pump, wherein the first and second fluid passages are sized to restrict rapid fluid flow between the reservoir and the first and second piezoelectric pumps.

3. A piezoelectric optical relay in accordance with claim 1, wherein the first piezoelectric pump comprises:

a first pumping chamber formed within the relay housing; and a first pair of piezoelectric elements, coupled end to end and forming a first side of the first pumping chamber;

wherein shearing motion of the first pair of piezoelectric elements changes the volume of the pumping chamber.

4. A piezoelectric optical relay in accordance with claim 3, wherein the first piezoelectric pump further comprises a second pair of piezoelectric elements, coupled end to end and forming a second side of the first pumping chamber, wherein shearing motion of the second pair of piezoelectric elements changes the volume of the pumping chamber.

5. A piezoelectric optical relay in accordance with claim 1, wherein the first optical path comprises:

a first optical waveguide configured to transmit light into the switching channel;

a second optical waveguide, optically aligned with the first optical waveguide and configured to receive light from the first optical waveguide when the first and third liquid metal droplets are separated.

6. A piezoelectric optical relay in accordance with claim 1, further comprising a second optical path, passing between the second and third liquid metal droplets.

7. A piezoelectric optical relay in accordance with claim 1, further comprising a slug coupled to the third liquid metal droplet, wherein the slug moves with a motion of the third liquid metal droplet.

8. A piezoelectric optical relay in accordance with claim 1, wherein the relay housing comprises:

a circuit substrate layer supporting electrical connections to the first and second piezoelectric pumps;

a piezoelectric layer containing the first and second piezoelectric pumps;

a switching layer, positioned between the circuit substrate layer and the piezoelectric layer, in which the switching channel is formed;

a reservoir layer having a reservoir for containing actuation fluid formed therein; and a channel cap layer, positioned between the piezoelectric layer and the switching layer; the channel cap layer having first and second orifices therein to allow actuation fluid to pass between the first and second piezoelectric pumps and the switching channel.

9. A piezoelectric optical relay in accordance with claim 8, wherein the relay housing further comprises a passage layer positioned between the reservoir layer and the piezoelectric layer, the passage layer containing a first fluid passage coupling the reservoir to the first piezoelectric pump and a second fluid passage coupling the reservoir to the second piezoelectric pump.

10. A piezoelectric optical relay in accordance with claim 8, wherein the first optical path comprises:

a first optical waveguide embedded in a first notch in the switching layer and configured to transmit light into the switching channel;

a second optical waveguide embedded in a second notch in the switching layer and optically aligned with the first optical waveguide, the second optical waveguide being configured to receive light from the first optical waveguide if the first and third liquid metal droplets are separated.

11. A method for switching an optical path in a piezoelectric optical relay having a first liquid metal droplet moveable within a switching channel, the method comprising:

coupling an input optical signal to an input optical waveguide of the piezoelectric optical relay, the input optical waveguide being optically aligned with an output optical waveguide to form the optical path;

if the optical path is to be completed:
energizing a first piezoelectric pump to move actuation fluid into the switching channel and thereby move the first liquid metal droplet out of the optical path, whereby the input optical waveguide is optically coupled to the output optical waveguide; and if the optical path is to be broken:
energizing a second piezoelectric pump to move actuation fluid into the switching channel and thereby move the first liquid metal droplet into the optical path, whereby the input optical waveguide is optically decoupled from the output optical waveguide.

12. A method for switching an optical path in a piezoelectric optical relay in accordance with claim 11, wherein a slug coupled to the first liquid metal droplet is operable to block or unblock the optical path.

13. A method for switching an optical path in a piezoelectric optical relay in accordance with claim 11, wherein energizing the first piezoelectric pump causes at least one piezoelectric element to deform in a shear mode and decrease the volume of a first pumping chamber.

14. A method for switching an optical path in a piezoelectric optical relay in accordance with claim 11, wherein the first liquid metal droplet is in wetted contact with a first contact pad positioned in the switching channel between a second contact pad and a third contact pad and wherein:
   energizing the first piezoelectric pump causes the first liquid metal droplet to coalesce with a second liquid metal droplet in wetted contact with the second contact pad; and
   energizing the second piezoelectric pump causes the first liquid metal droplet to coalesce with a third liquid metal droplet in wetted contact with the third contact pad.

15. A method for switching an optical path in a piezoelectric optical relay in accordance with claim 11, further comprising:
   if the optical path is to be completed:
      energizing the second piezoelectric pump to draw actuation fluid out of the switching channel and thereby move the first liquid metal droplet out of the optical path; and
   if the optical path is to be broken:
      energizing the first piezoelectric pump to draw actuation fluid out of the switching channel and thereby move the first liquid metal droplet into the optical path.

16. A method for switching an optical path in a piezoelectric optical relay in accordance with claim 11, further comprising:
   if the optical path is to be completed:
      de-energizing the first piezoelectric pump after the first liquid metal droplet has been moved out of the optical path; and
   if the optical path is to be broken:
      de-energizing the second piezoelectric pump after the first liquid droplet has been moved into the optical path.

17. A method for switching an optical path in a piezoelectric optical relay in accordance with claim 16, wherein the de-energizing is performed slower than the energizing to allow actuation fluid to be drawn from a reservoir of actuation fluid.

18. A method for switching an optical path in a piezoelectric optical relay in accordance with claim 11, wherein the first piezoelectric pump comprises a pumping chamber bounded in part by first and second piezoelectric elements joined end-to-end and wherein energizing the first piezoelectric pump comprises:
   applying an electrical voltage across the first piezoelectric element to cause it to deform in a shearing mode and change the volume of the first pumping chamber.

19. A piezoelectric relay comprising:
   a relay housing containing a switching channel;
   a first contact pad located in the switching channel and having a surface wettable by a liquid metal;
   a second contact pad located in the switching channel and having a surface wettable by a liquid metal;
   a third contact pad located in the switching channel between the first and second contact pads and having a surface wettable by a liquid metal;
   a first liquid metal droplet in wetted contact with the first contact pad;
   a second liquid metal droplet in wetted contact with the second contact pad;
   a third liquid metal droplet in wetted contact with the third contact pad and adapted to move within the switching channel to coalesce with one of the first liquid metal droplet and the second liquid metal droplet;
   a first electrical path operable to be coupled to the first contact pad and the third contact pad;
   a second electrical path operable to be coupled to the second contact pad and the third contact pad;
   a first piezoelectric pump operable to pump actuation fluid into the switching channel between the second liquid metal droplet and the third liquid metal droplet, thereby causing the second and third liquid metal droplets to separate and the first and third liquid metal droplets to coalesce; and
   a second piezoelectric pump operable to pump actuation fluid into the switching channel between the first liquid metal droplet and the third liquid metal droplet, thereby causing the first and third liquid metal droplets to separate and the second and third liquid metal droplets to coalesce;
   wherein the first electrical path is completed when the first and third liquid metal droplets are coalesced and the second electrical path is completed when the second and third liquid metal droplets are coalesced.

20. A piezoelectric relay in accordance with claim 19, further comprising a slug operable to be coupled to one of:
   the first contact pad and the third contact pad; and
   the second contact pad and the third contact pad.

21. A method for switching one or more electrical signal paths in a piezoelectric relay having a first liquid metal droplet moveable within a switching channel, the method comprising:
   coupling an input electrical signal to a first contact pad and a third contact pad of the piezoelectric relay;
   if a first electrical signal path is to be completed:
      energizing a first piezoelectric pump to move actuation fluid into the switching channel and thereby move the first liquid metal droplet, so that the first liquid metal droplet is coupled to the third contact pad and the first contact pad; and
   if a second electrical signal path is to be broken:
      energizing a second piezoelectric pump to move actuation fluid into the switching channel and thereby move the first liquid metal droplet, so that the first liquid metal droplet is coupled to the third contact pad and a second contact pad.

22. A method for switching one or more electrical signal paths in a piezoelectric relay in accordance with claim 21, wherein the first liquid metal droplet is coupled to a slug, said slug operable to couple the third contact pad to one or more of the first contact pad and the second contact pad.

* * * * *